United States Patent [19]

Glassey et al.

[11] Patent Number: 5,315,876
[45] Date of Patent: May 31, 1994

[54] PURGE GAS PRESSURE MONITORING SYSTEM

[75] Inventors: Eugene A. Glassey; Ralph A. Loh, both of San Diego, Calif.

[73] Assignee: Fluid Data Systems, San Diego, Calif.

[21] Appl. No.: 883,143

[22] Filed: May 14, 1992

[51] Int. Cl.⁵ .......................... G01L 9/00; G01L 19/04
[52] U.S. Cl. .................................. 73/708; 73/301; 73/714; 374/143
[58] Field of Search ................ 73/301, 302, 714, 708, 73/701; 374/143

[56] References Cited

U.S. PATENT DOCUMENTS

| | | | |
|---|---|---|---|
| 3,043,144 | 7/1962 | Glassey | 73/401 |
| 3,407,664 | 10/1968 | Glassey | 73/401 |
| 3,475,959 | 11/1969 | Glassey | 73/296 |
| 4,089,058 | 5/1978 | Murdock | 364/571 |
| 4,266,430 | 5/1981 | Glassey | 73/701 |
| 4,277,981 | 7/1981 | Glassey | 73/701 |
| 4,722,228 | 2/1988 | Awa et al. | 73/301 |
| 5,005,408 | 4/1991 | Glassey | 73/301 |
| 5,163,321 | 11/1992 | Perales | 374/143 |

*Primary Examiner*—Donald O. Woodiel
*Attorney, Agent, or Firm*—Brown, Martin, Haller & McClain

[57] ABSTRACT

A purge gas pressure monitoring system has a piezometer tube running from a pressure measuring instrument into a medium to be monitored. A temperature detector device extends the length of the piezometer tube. Outputs from the pressure measuring instrument and the temperature detector device are coupled to a central processing device or microcomputer for monitoring the outputs and using the outputs along with stored data to calculate a corrected pressure signal which is corrected for errors including errors arising as a result of variations of the average temperature along the piezometer line from a reference value.

9 Claims, 5 Drawing Sheets

PURGE GAS PRESSURE MONITORING SYSTEM

BACKGROUND OF THE INVENTION

The present invention relates generally to pressure monitoring systems of the purge gas type in which purge gas is injected into media to facilitate measurement of media pressure and other parameters.

In purge gas pressure monitoring systems, a piezometer tube runs from a pressure measuring instrument into a medium to be monitored. Purge gas is supplied to the tube to escape as bubbles at the end of the tube submerged in the medium. The pressure of gas escaping from the tube is a function of the pressure of the medium into which it is bubbled, and the bubble gas pressure can be monitored by a suitable pressure-responsive instrument such as a pressure transducer or balanced beam manometer device. The output from the instrument is provided to a suitable output device for providing a visual indication of the pressure. The output device may be a suitable data recorder such as an electronic data logger or a video display screen.

Such systems are subject to various errors which cause inaccuracies in the results. The purge gas technique is subject to gas weights errors due to the vertical weight of gas in the bubbler tube, as described in U.S. Pat. No. 5,005,408 of Glassey. It is also subject to errors as a result of temperature variations. Some errors are inherent in the type of pressure-responsive instrument used. For example, spring-opposed pressure transducers must be compensated for variations of Earth gravity, and are also subject to errors as a result of change in temperature of the transducer case and/or body.

Attempts have been made in the past to compensate for some of these errors. However, these have been typically applied to a specific pressure-responsive instrument and have been inconvenient to use in some cases.

SUMMARY OF THE INVENTION

It is an object of the present invention to provide a purge gas pressure monitoring system with improved error compensation.

According to the present invention, a purge gas pressure monitoring system is provided which comprises a piezometer tube having an outlet end for submerging in a medium to be monitored and an opposite second end connected to a pressure-responsive instrument for producing a first output signal proportional to the pressure at the second end of the piezometer tube, a temperature detector device extending along the length of the piezometer line for producing a second output signal proportional to the average temperature along the length of the line, and a central processing device connected to the pressure-responsive instrument and the temperature detector device for monitoring their outputs and producing an output signal equivalent to a predetermined parameter of the monitored medium. The central processing device is connected to an input device for operator input of various parameters for use in the system, and to a suitable output device for providing a visual indication of the final output signal and optional other criteria of the system.

The system includes a gas weights compensation for compensating for gas weights errors in the output signal from the pressure-responsive instrument. This compensation may be built into the pressure-responsive instrument itself, or may be included in the stored program instructions of the central processing device which works out the gas weights compensation from the data received from the pressure-responsive instrument and data input by the operator and incorporates the compensation in the output signal. Additionally, the central processing unit includes stored program instructions for compensating the output signal as a function of temperature variations to provide an output which is substantially independent of temperature variations.

The system is designed for use with any pressure monitoring instrument and in any of the various applications of purge gas pressure monitoring, in water and other media typically monitored by such systems. The central processing device or microcomputer may have other inputs for receiving other detector output signals, for example density monitoring information, for use in further modifying the output to compensate for other errors or for producing other output signals representative of other monitored parameters on a suitable display screen. The system is compatible with existing pressure monitoring systems and can be used to upgrade such systems for improved accuracy.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which.

DESCRIPTION OF THE PREFERRED EMBODIMENT

Figure 1:
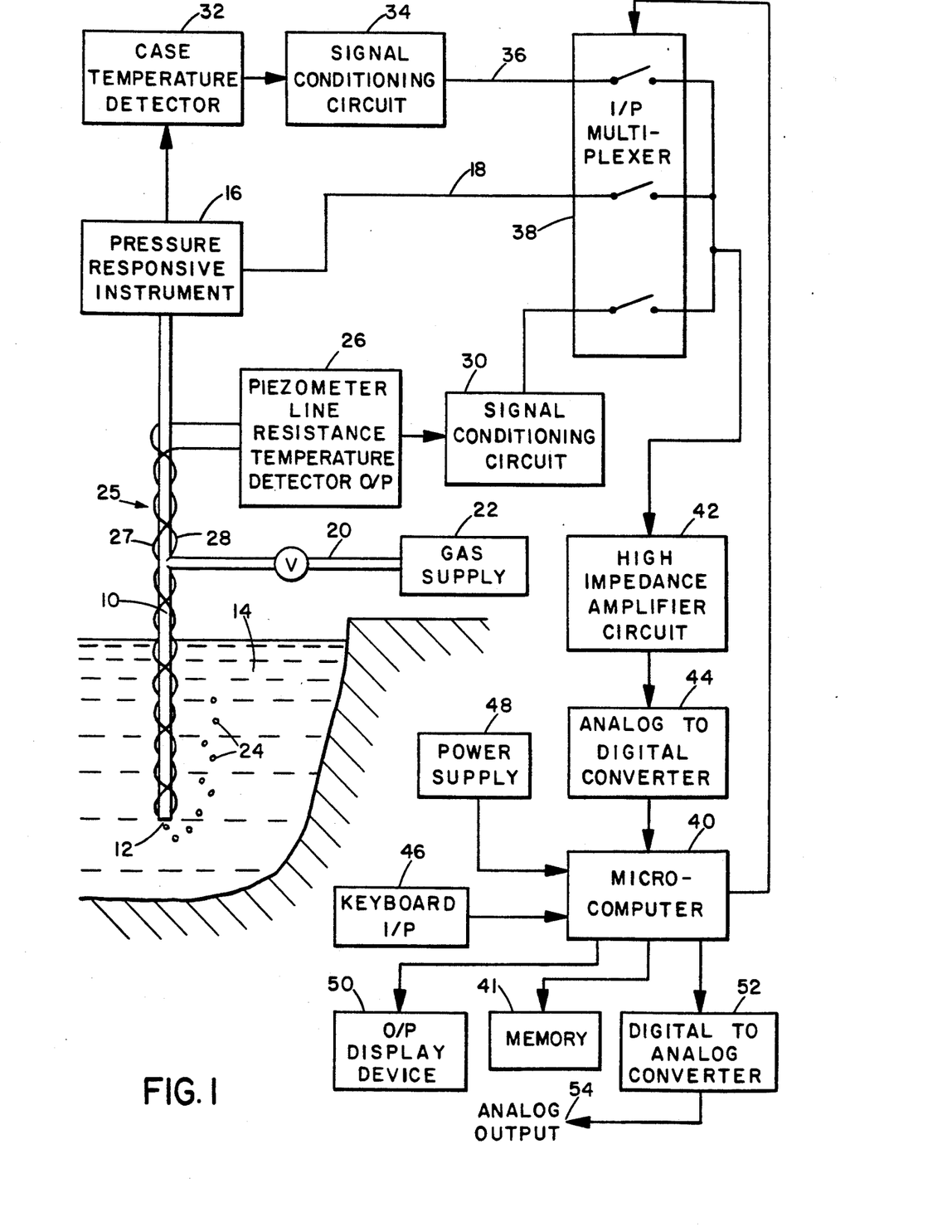
FIG. 1 is a schematic block diagram of a purge gas pressure monitoring system according to a preferred embodiment of the present invention.

FIG. 1 illustrates a purge gas pressure monitoring system according to a preferred embodiment of the present invention. The system includes a piezometer line or tube 10 submerged at one, outlet end 12 in a medium 14 to be monitored, in this case a body of water, and a pressure-responsive instrument 16 connected to the opposite end of the line for producing an output signal 18 dependent on pressure in the line. The piezometer line is connected via line 20 to a valved supply 22 of bubbler gas which supplies gas to the tube to emerge in the form of bubbles 24 from the outlet end 12. Although the system is used in the illustrated embodiment in hydrologic water stage monitoring, it will be understood that it is equally applicable in other areas where purge gas pressure monitoring is typically used, such as monitoring of many other types of liquid and fluid media including stratified media, fluidized combustion beds in steam boilers, cryogenic tank monitoring, and so on.

A suitable temperature detector 25 is provided along the length of the piezometer line to provide an output signal 26 dependent on the average temperature along the line. In the illustrated embodiment, the temperature detector comprises a resistance wire temperature detector which extends along the length of the line. However, other types of temperature detectors may be used in other embodiments of the invention. In the illustrated embodiment, the detector is of elongated U-shape, with opposite legs 27, 28 of the U being wound spirally in opposite directions along the line, as described in our copending application entitled "Purge Gas Pressure Monitoring System With Temperature Compensation" filed on Apr. 10, 1992. The overall resistance will therefore be dependent on the average temperature along the line, and the ends of the legs are connected to a signal conditioning circuit 30 converting this resistance to an output voltage proportional to the temperature.

Dependent on the type of pressure-responsive instrument used, a case temperature detector 32 may be provided for monitoring the instrument case temperature. This detector will typically be needed for accuracy where a spring restored pressure transducer is used as the pressure-responsive instrument, but will not normally be needed if the instrument is a balanced beam manometer of the type described in my U.S. Pat. No. 5,005,408 referred to above, since such instruments are normally relatively immune to changes of readings as a result of change in temperature of the surrounding ambient air. The case temperature detector 32 may comprise a thermocouple or resistance temperature detector bonded to the instrument case. The output of detector 32 is connected to signal conditioning circuit 34 for converting the output to a an output voltage signal 36 proportional to the detected temperature. Other types of pressure monitoring instruments may also be used, including float-actuated potentiometers.

The outputs of the pressure-responsive instrument and two temperature detectors are provided as inputs to input multiplexer or switching circuit 38 which connects each of the incoming signals in turn to microcomputer 40 via a high impedance amplifier circuit 42 and an analog to digital converter 44. The latter two circuits are of a conventional nature and will not be described in any more detail here.

Microcomputer 40 has a conventional memory 41 and inputs connected to a keyboard or keypad 46 for operator input of commands and data, and to a suitable power supply 48 which is preferably a battery. A first output is connected to a conventional computer output display device 50 which is a liquid crystal display or video screen. An output printer unit (not illustrated) is preferably also provided at the output. A second output is connected to a digital to analog converter 52 to provide an analog output signal 54 which is compatible with conventional analog data loggers and the like which are typically used in purge gas pressure monitoring systems.

Figure 2:
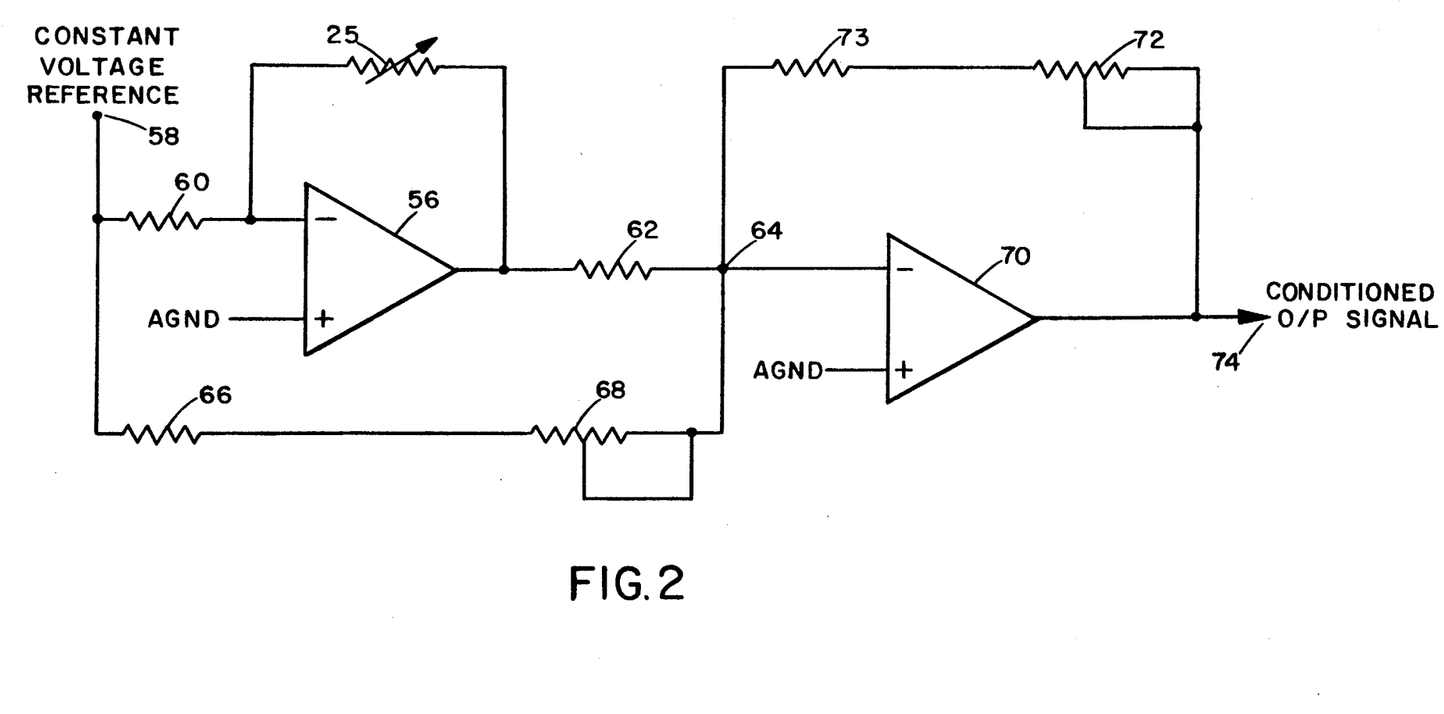
FIG. 2 is a schematic of the signal conditioning circuitry for conditioning the outputs of the temperature detectors.

One of the signal conditioning circuits for conditioning the resistance temperature detector outputs is illustrated in more detail in FIG. 2. The resistance temperature detector is connected as a variable feedback resistor across differential amplifier 56, and a reference voltage source 58 is connected to the input of amplifier 56 via input resistor 60. The other input is grounded. The output of amplifier 56 is connected to a resistor 62 and summed at junction 64 to a variable offset voltage via resistor 66 and variable resistor 68. The summed voltage is applied as an input to a second amplifier 70 across which a variable gain resistor 72 and resistor 73 are connected. A conditioned output signal is provided at the output 74 of amplifier 70.

With a 2 volt reference voltage, for example, the output signal 74 is arranged by suitable setting of the components in the circuit to produce an output in the range of 0 to 2 volts over a temperature range from −40° C. to +60° C., which is the maximum possible range typically encountered in purge gas pressure monitoring systems. In one example of a conditioning circuit for producing the conditioned output, resistances 60 and 62 were 10 KOhm, resistance 66 was 234 KOhm, resistance 73 was 160 KOhm, the two variable resistors had a maximum resistance of 10 KOhm, resistors 75, 76 were both 3.3 MOhm and capacitors 77, 78 were both 0.0015 Farad capacitors. The amplifiers were both CA3078AS components made by RCA.

The computer is suitably programmed to scan the output signals sequentially at predetermined intervals, and to use the scanned data as well as stored information in order to calculate a corrected output signal representative of a desired parameter of the monitored medium, such as liquid pressure or depth. FIG. 3 is a flow diagram illustrating the steps performed by the program in order to produce the desired output signal for connection to the output device 50.

In my U.S. Pat. No. 5,005,408 referred to above, a technique for calculating a gas weights error compensation factor for a purge gas system and incorporating the compensation into the output from a pressure monitoring instrument was explained. As described in this patent, an approximate gas weights compensation factor may be calculated from the following relationship:

$$P_g = D_w(H_h - H_r) - D_n \frac{D_w(H_h - H_r) + P_z}{P_o} (H_i - H_r) - D_z(H_h - H_r) \quad (1)$$

In which:

| | UNITS |
|---|---|
| $P_g$ = Pressure of the purge gas analog of depth (Gauge) | $Kg/M^2$ |
| $D_w$ = Density of gauged water, assume unit, (1000 $Kg/M^3$) | 1000 $Kg/M^3$ |
| $H_h$ = Height of water, (For convenience use maximum stage, or maximum possible liquid depth) | Meters above sea level |
| $H_r$ = Height of reference, (Bubbler level), (Choose z = $H_r$) | Meters above sea level |
| $H_i$ = Highest point of bubbler line (Apex, usually in proximity of plumbing Tee to instruments) | Meters above sea level |
| $P_z$ = Local atmospheric pressure at elevation z | From Equation (3), below |
| $P_o$ = Standard atmosphere pressure at sea level, o | 10,322 $Kg/M^2$ |
| $D_z$ = Local density of air at pressure $P_z$ | From Equation (2), below |
| $D_o$ = Standard atmosphere density of sea level, o | 1,226 $Kg/M^3$ |
| $D_n$ = Standard nitrogen density of sea level | 1,250 $Kg/M^3$ |
| o = Sea level elevation reference | Zero |
| z = Station elevation above sea level | Meters |

In this equation, the gauge pressure or pressure P measured by the pressure-responsive instrument is equal to the weight, as a function of pressure, of the column of monitored water (first term) minus the weight, as a function of pressure, of the purge gas column in the bubbler tube (second term) and the weight, as a function of pressure, of the column of atmosphere displaced by the water. This may be used in order to calculate a gas weights compensation factor to be used at a particular installation. In my U.S. Pat. No. 5,005,408 referred to above, this compensation factor was built into the pressure-responsive instrument itself so that the output from the instrument was already compensated for gas weights errors. In the preferred embodiment of the present invention, the computer is programmed to calculate a gas weights compensation factor based on data stored in its memory 41 as regards the constant terms in the above equation, and data input by the operator on the site variable terms, i.e. $H_h$ or maximum possible liquid or medium depth, the height of the bubbler line output or $H_r$ and the highest point of the bubbler line $H_i$ or the height of the pressure-responsive instrument. Other standard reference values in the equation (1) above will be stored in the computer's memory.

Another source of error which exists in purge gas pressure monitoring systems is due to the change in purge gas weight with temperature variations. The size of this error will be dependent to some extent on the type of installation and the typical temperature changes encountered along the length of the line and with daily ambient temperature variations. However, it can be a relatively large error in installations where temperatures can typically range from very cold to very hot. In hydrologic water-stage monitoring, piezometer lines may be exposed to temperatures ranging from desert sun to arctic cold in regions above the water surface, and to the actual water temperatures in the submerged regions of the lines. These temperatures may vary considerably. In other applications even greater temperature extremes may be encountered, for example in the many industrial processes where purge gas pressure monitoring is employed, from fluidized combustion beds in steam boilers to cryogenic tank gauging.

In equation (1) above, the second term represents the gas weights compensation and the third term represents the weight of displaced atmosphere. As noted above, the weight of the gas column will change with temperature variations. This change of weight may be calculated with application of the general gas law, as follows:

$$\frac{v_1}{v_0} = \frac{T_1}{T_0} = \frac{P_0}{P_1}$$

where v represents volume, T represents absolute temperature, and p represents absolute pressure.

By definition, density is weight per unit volume. The volume of the gas column does not change. Thus, substituting the inverse weight for the volume, a simple equation may be written for the described conditions:

$$\frac{T_2}{T_1} = \frac{W_1}{W_2} \qquad (2)$$

This may be used in the standard gas weights equation (1) above for a particular installation to work out a corrected gauge pressure over a range of temperatures from $-40°$ to $+60°$. Change in temperature will simply change the second and third terms of the gas weights equation as a function of the ratio of the change in temperature from a selected reference, for example 15° C., the reference temperature for standard atmosphere. Thus, a temperature compensation factor for a detected temperature may be calculated and used in correcting the output pressure value in order to produce the desired temperature compensated output signal.

The steps performed by the program in producing the output signal will now be described in more detail with reference to the flow diagram of FIGS. 3A, 3B, 3C and 3D. After the power supply is switched on or a system reset occurs (step 80), the central processing unit, liquid crystal display or output device, A/D converter and D/A converter are initialized (step 81). In this step, the I/O ports of the microcomputer are set to input or output and to the logic level as dictated by the circuit design. The liquid crystal display is cleared and initialized to the mode of operation to be used. The A/D channel logic is cleared and set to the 00 channel. The D/A converter is set to zero volts output.

Figure 3A:
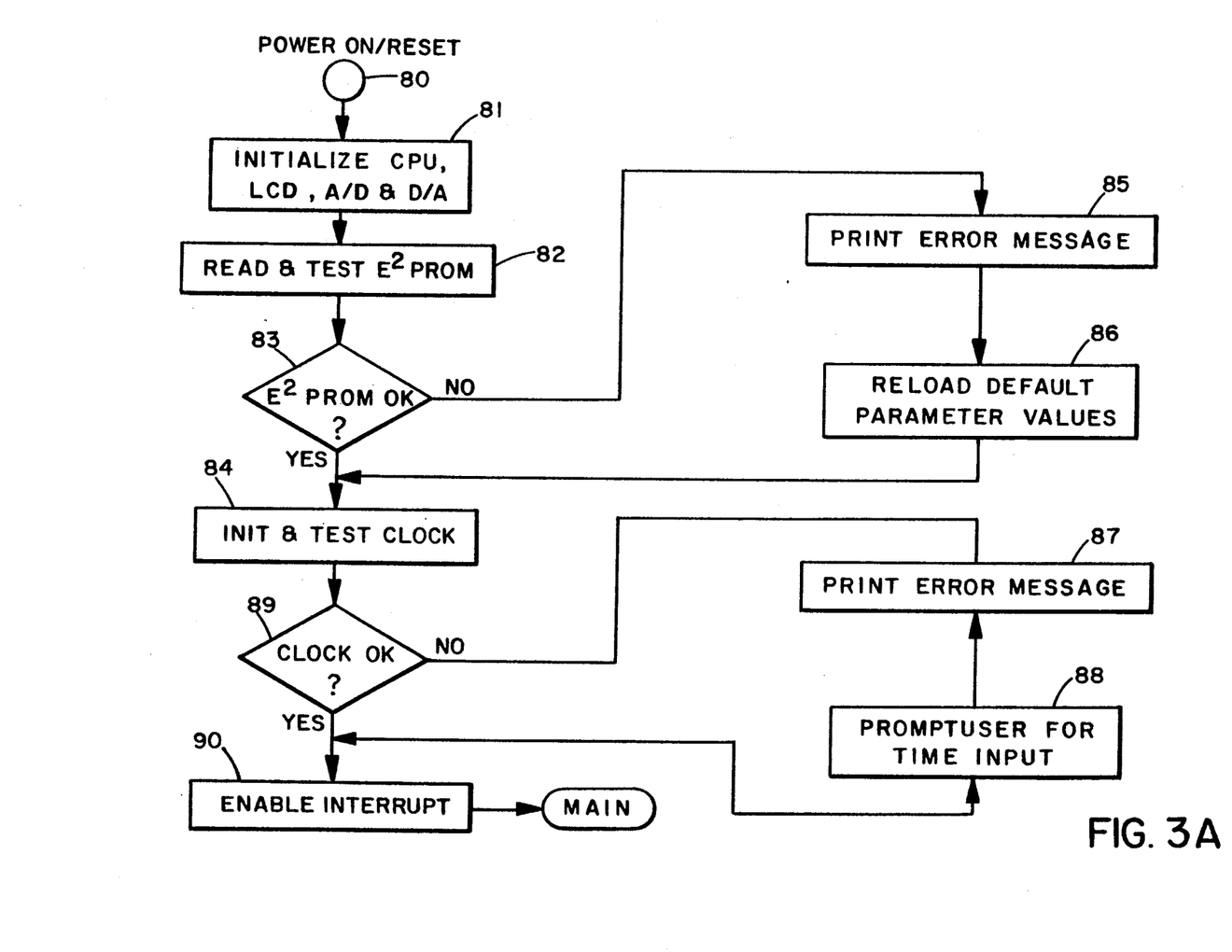
FIGS. 3A, 3B, 3C and 3D are flow diagrams of the system operation.

The E prom or system memory 41 is then read and tested in step 82. The stored operating parameters of site elevation data, scan interval and full scale calibration are read into the memory for use in the program. If the memory responded correctly to the test (83), the program continues to step 84 to read and test the clock for proper operation. If not, an error message is sent to the display (step 85) and default parameters are loaded into the memory (86), and the program continues.

If the clock does not respond properly to the test, an error message is printed (87) and the operator is asked to enter the date and time at the keypad (step 88). If the clock tests correctly (89), the program proceeds to the enable interrupts step 90, which enables two interrupt subroutines which are illustrated in FIGS. 3C and 3D and will be described in more detail below.

Figure 3B:
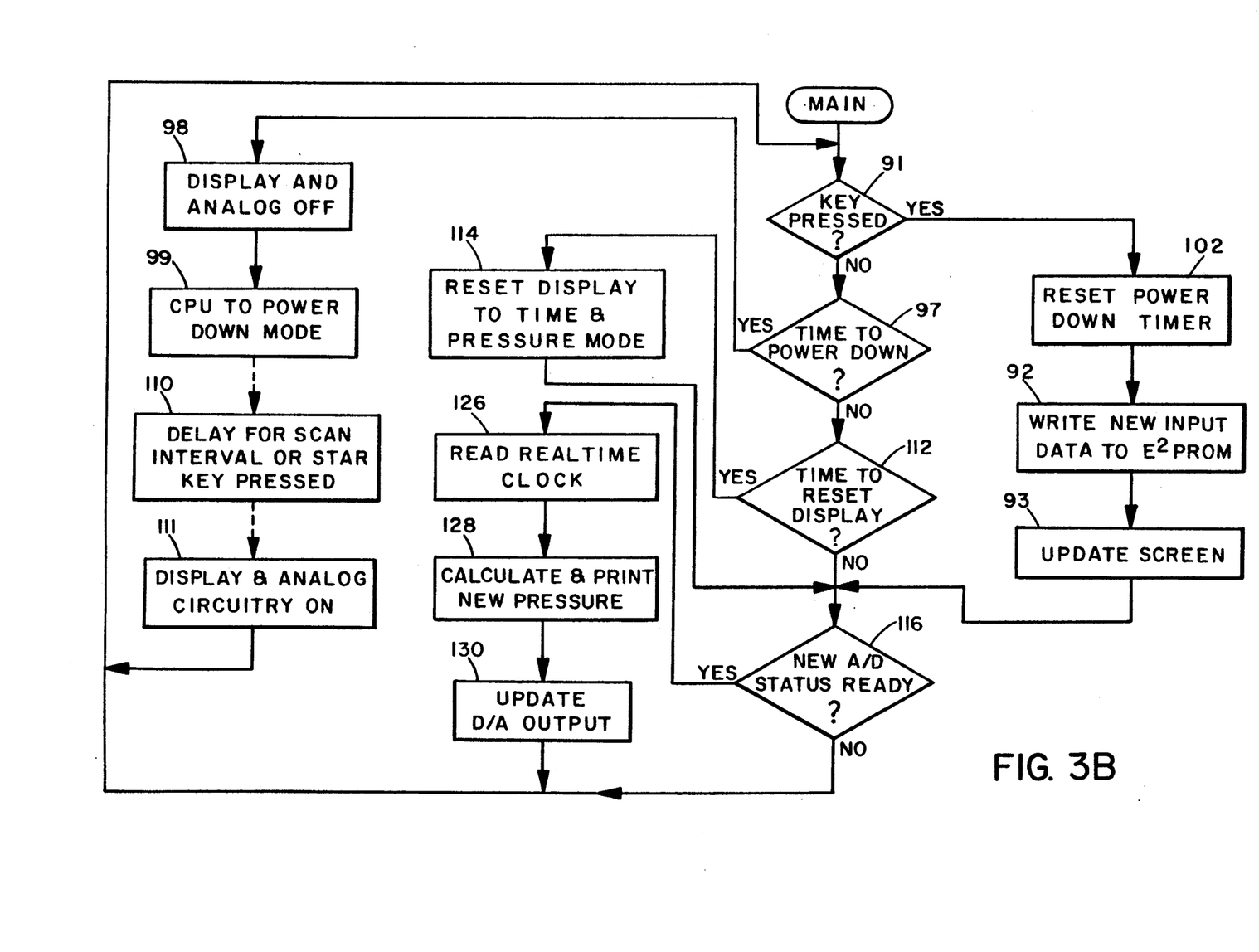
Figure 3C:
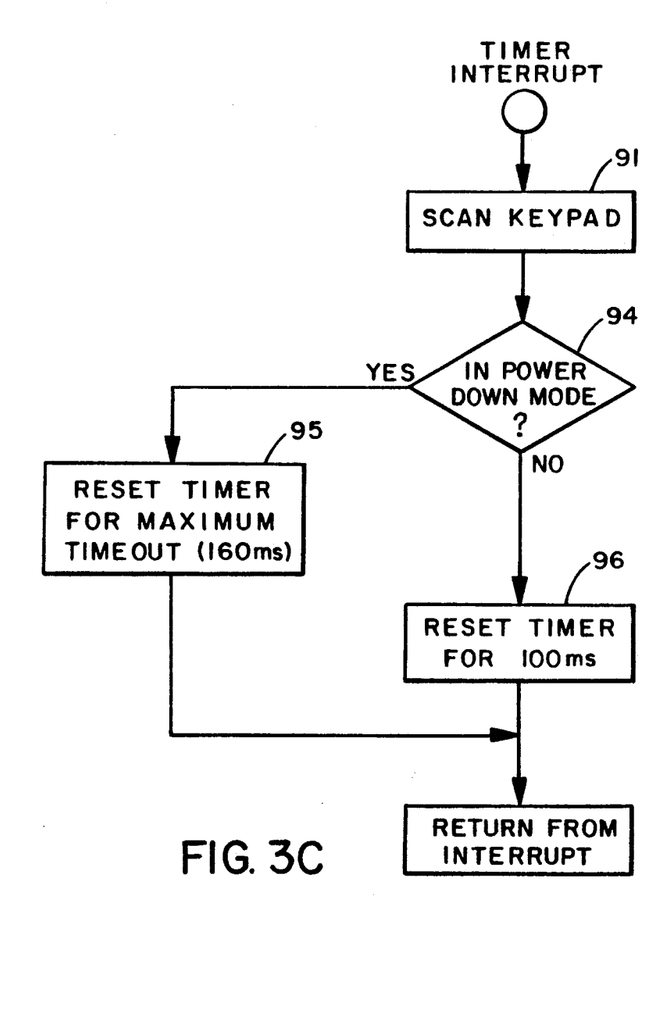
Figure 3D:
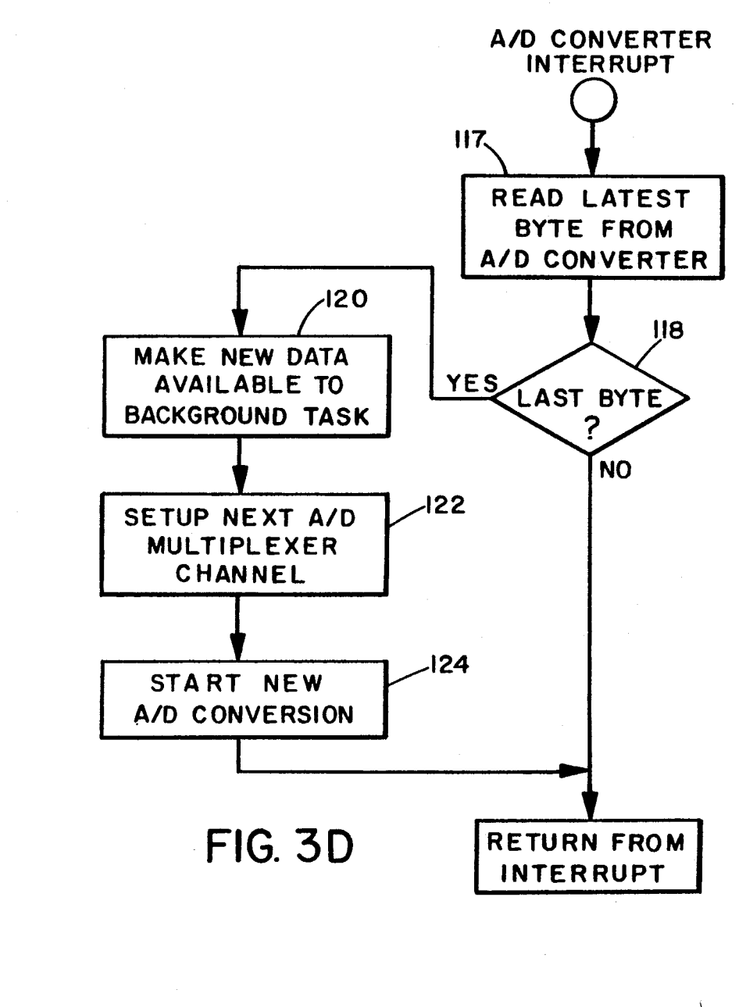

The program then proceeds as in FIG. 3B, which illustrates the main part of the program for sequentially collecting the data and calculating the pressure output signal. The microcomputer is interrupted at periodic intervals to scan the keypad (step 91) to determine whether a key has been pressed, via the timer interrupt subroutine illustrated in FIG. 3C. If a key has been pressed, the key pad is read and the power down timer is reset (102). For example, if the operator is entering new input parameter data, a control key is first actuated which provides a command to change the data. The data is then entered via the numeric keys and this will be input to memory (92) and the screen will be updated (93). As illustrated in FIG. 3C, after each scan of the keypad (91), the timer is reset to the appropriate interval based on whether the system is in a lower power mode (steps 94, 95, 96).

Turning back to FIG. 3B, if no key is pressed, the program then proceeds to determine whether it is time to power down (97). A software timer is used to power down the microcomputer if no operator intervention has taken place on the keypad over a predetermined time interval. This turns off the display and certain analog circuits (98) and puts the central processing unit in a low power mode (99). A delay is then set to re-initiate the system after expiry of the scan interval or operator entry of a start up command on the keypad (110), after which the circuitry is switched on (111) and the program returns to step 91. If it is not time to power down, the program then determines whether it is time to reset the display (112). The normal display output is the corrected pressure along with the date and time. This data is continuously updated every second (114).

After step 112, the program then determines whether a new A/D status is ready (116). This is because the system takes a certain time period to read in all the data from the A/D converter. The A/D converter interrupt illustrated in FIG. 3D provides the software for ensuring all data is read before a computation is performed. Data from each multiplexer input channel is read from the A/D converter to the microcomputer (117) in five sequenced bytes, and the microcomputer is interrupted for each byte via a strobe pulse. If the last byte of a set of data from a particular channel has not yet been read (step 118), the program cycles back from the interrupt to step 91 until the next byte is read. If the current data byte is determined to be the last byte of data from that channel, the accumulated data is made available for further processing (step 120), the multiplexer is switched to read the next channel (step 122), and a new A/D conversion is started (step 124), before returning to the main program (FIG. 3B).

If the new A/D status is ready, i.e. the last byte of data needed has been received, the clock timer is read (126) to take the time reading, and the last raw pressure reading from the pressure-responsive instrument is corrected for purge gas weight, atmospheric buoyancy, and temperature based on the output temperature reading from the resistance temperature detector (step 128). In this step, a calculation is performed using equation (1) above in order to correct for gas weights. The memory contains stored tables of voltage versus temperature for the resistance temperature detector, and the program includes a step for looking up the temperature and using the determined temperature to correct the pressure reading based on equations (1) and (2) above, so that the pressure can be corrected for change of gas weight with temperature variation from a reference value. Thus, the parameters used in order to provide a corrected output pressure reading in step 128 include the internal constants written into the memory, operator entered site parameters of elevation, and the current temperature of the piezometer line.

If the resistance temperature detector is of resistance wire as described in the preferred embodiment above, the wire resistance will vary with temperature and can be calibrated to produce a table of actual resistance variation with temperature, which is stored in the microcomputer memory and used as a look-up table when each corrected pressure is calculated.

Once the corrected pressure has been calculated, it is displayed on the digital display device and printed, and also output to the D/A converter to provide an updated analog output (step 130). The program then cycles back to step 91 and repeats the procedure to calculate the next corrected pressure output. The system is arranged to produce a new corrected output pressure reading every second.

Although the system described above has three monitor inputs from the pressure-responsive instrument, resistance temperature detector, and case temperature detector (if used), it has the capability of receiving inputs from other sensors to allow compensation of the output signal for other variable factors which might introduce errors in the output, if such compensations are necessary. This will be dependent on the actual installation site. For example, one other input may be connected to a sedimeter for monitoring sediment level where sediment variations are likely to produce a significant error. Another input may be connected to a dc anemometer for detection of wind velocity, in order to allow compensation for Seiche wave effects where such effects might be significant. Yet another input may provide the differential pressure between the piezometer line orifice and the hydrostatic pressure at the same elevation, to allow compensation for the Bernoulli effect or draw-down, in other words the reduced pressure caused by flow of fluid media past an orifice. The principle is the same as draft created by wind blowing across a chimney, and is known as draw-down in hydrology. The actual pressure difference created by this phenomenon may be measured by mounting a piezoelectric sensor a short distance above the piezometer tube outlet and running outputs from the sensor along the line for connection to one of the other multiplexer input channels. Preferably, the multiplexer has up to eight inputs.

This system allows the output from a suitable pressure transducer connected to a bubbler line to be monitored continuously and the raw pressure output to be corrected for gas weights as well as for temperature variations to provide a gas weights and temperature compensated output at periodic intervals. The system is convenient and easy to install and use, and can be easily set up for any particular installation in order to yield very accurate results.

Although a preferred embodiment of the invention has been described above by way of example only, it will be understood by those skilled in the field that modifications may be made to the disclosed embodiment without departing from the scope of the invention, which is defined by the appended claims.

We claim:

1. A purge gas pressure monitoring system, comprising:
   a piezometer line having a first, outlet end for submerging in a medium to be monitored and a second end;
   a gas supply connected to the piezometer line for injecting gas into the medium in the form of bubbles from the outlet end of the piezometer line;
   a pressure-responsive instrument connected to the second end of the piezometer line for producing a first output signal proportional to the pressure at the second end of the piezometer line;
   a temperature detector device extending along the length of the piezometer line for producing a second output signal proportional to the average temperature along the piezometer line;
   data processing means connected to monitor said first and second output signals at periodic intervals for producing a corrected output signal after each interval in which said first output signal is corrected for variations in said second output signal from a reference temperature;
   said data processing means including memory means for storing program instructions and data;
   display means linked to said data processing means for displaying said corrected output signal to an operator; and
   input means linked to said data processing means for operator input of commands and data.

2. The system as claimed in claim 1, including gas weights compensation means for compensating for predetermined gas weights errors in said first output signal.

3. The system as claimed in claim 1, wherein said gas weights compensation means comprises part of said data processing means.

4. The system as claimed in claim 1, wherein said temperature detector device comprises a resistance temperature detector, and said memory means includes a stored table of resistance values as a function of temperature in a predetermined range, said data processing means including means for looking up a temperature based on each received second output signal and for computing a corrected output signal based on said temperature.

5. The system as claimed in claim 1, wherein said data processing means has two outputs, said corrected output signal being provided to both outputs, said display means including a digital display device connected to one of said outputs and a digital to analog converter connected to the other output, the digital to analog converter having an analog output for connection to an analog data collecting device.

6. The system as claimed in claim 1, including a second temperature detecting device for detecting temperature variations at the pressure-responsive instrument, the data processing means being connected to monitor output from said second temperature detecting device and including means for correcting the output signal in proportion to the detected temperature.

7. The system as claimed in claim 1, including switching means connected to the outputs of said pressure-responsive instrument and temperature detecting device for connecting said outputs sequentially to said data processing means.

8. The system as claimed in claim 1, including signal conditioning means connected to the output of said temperature detecting device for producing a conditioned output signal, said conditioned output signal being connected to said data processing means, said conditioning means comprising means for producing an output voltage which varies as a function of the output of said temperature detecting device.

9. A method of measuring pressure in a body of liquid, comprising the steps of:
  sensing the pressure at a submerged level in the body of liquid to produce a first output pressure signal dependent on the sensed pressure;
  applying the pressure signal as an input to a pressure-responsive instrument at a location spaced from said submerged level, the pressure-responsive instrument having an output proportional to the pressure input;
  calculating an error compensation factor to compensate for predetermined errors in the output of the pressure-responsive instrument as a result of gas weights;
  modifying the output of said pressure-responsive instrument by said gas weights error compensation factor;
  sensing the average temperature between the submerged level and the pressure-responsive instrument;
  modifying the output of said pressure-responsive instrument as a function of the variation of said average temperature from a reference value; and
  providing a compensated output signal corrected for gas weights and temperature variations.

* * * * *